(12) United States Patent
Abe

(10) Patent No.: US 7,477,450 B2
(45) Date of Patent: Jan. 13, 2009

(54) LENTICULAR LENS SHEET AND PRODUCTION METHOD THEREFOR

(75) Inventor: Yoshio Abe, Niigata (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 113 days.

(21) Appl. No.: 10/523,810

(22) PCT Filed: Aug. 8, 2003

(86) PCT No.: PCT/JP03/10174

§ 371 (c)(1),
(2), (4) Date: Feb. 8, 2005

(87) PCT Pub. No.: WO2004/015462

PCT Pub. Date: Feb. 19, 2004

(65) Prior Publication Data

US 2006/0001962 A1    Jan. 5, 2006

(30) Foreign Application Priority Data

Aug. 9, 2002 (JP) ............................. 2002-232736

(51) Int. Cl.
*G03B 21/60* (2006.01)
(52) U.S. Cl. ..................... 359/455; 359/619
(58) Field of Classification Search ......... 359/453–457, 359/452, 619; G03B 21/60
See application file for complete search history.

(56) References Cited

U.S. PATENT DOCUMENTS

| | | | | |
|---|---|---|---|---|
| 4,509,823 A | * | 4/1985 | Moriguchi et al. | 359/457 |
| 5,361,163 A | * | 11/1994 | Matsuda et al. | 359/452 |
| 5,555,476 A | | 9/1996 | Suzuki et al. | 359/40 |
| 6,276,269 B1 | * | 8/2001 | Bravenec | 101/170 |
| 6,335,828 B1 | | 1/2002 | Hashimoto et al. | 359/443 |
| 6,384,970 B1 | | 5/2002 | Abe et al. | 359/455 |
| 6,816,307 B1 | * | 11/2004 | Sun | 359/457 |
| 2004/0075897 A1 | * | 4/2004 | Ookawa et al. | 359/455 |

FOREIGN PATENT DOCUMENTS

| | | |
|---|---|---|
| JP | 59-87042 | 6/1984 |
| JP | 59-89338 | 6/1984 |
| JP | 1-71726 | 5/1989 |
| JP | 2000-131506 | 5/2000 |
| JP | 2002-090890 A | 3/2002 |

* cited by examiner

*Primary Examiner*—Andrew T Sever
(74) *Attorney, Agent, or Firm*—Oblon, Spivak, McClelland, Maier & Neustadt, P.C.

(57) ABSTRACT

A wide-viewing-angle lenticular lens sheet and a production method therefore. The lenticular lens sheet (1) comprises a plurality of lenticular lenses (11) disposed on one surface of a translucent substrate, and convex lenses (12) disposed on the other surface of the translucent substrate each at a condensing position to which light from a lenticular lens (11) is condensed. External light absorbing units each consisting of only slant surfaces (13*a*, 13*b*) are disposed on the other surface of the translucent substrate at positions different from those of the lenses (12).

1 Claim, 8 Drawing Sheets

| | REFLECTED LUMINANCE [cd/m²] | VIEW ANGLE[deg] | | |
|---|---|---|---|---|
| | | H α | H γ | V α |
| EMBODIMENT | 3.4 | 35 | 60 | 4 |
| COMPARATIVE EXAMPLE | 5.0 | 35 | 45 | 4 |

LENTICULAR LENS SHEET AND PRODUCTION METHOD THEREFOR

TECHNICAL FIELD

The present invention relates to a lenticular lens sheet used in rear-projection televisions or the like, and to a manufacturing method for such a lenticular lens sheet.

BACKGROUND ART

Rear projection screens used in rear-projection televisions etc. have ordinarily a constitution of two superposed lens sheets. Specifically, they comprise a Fresnel lens sheet and a lenticular lens sheet so aligned that the former is on the side of a light source while the latter is on the side of a viewer, wherein the Fresnel lens sheet has the function of focusing rays of image light from a CRT (Cathode Ray Tube) or those having passed through a liquid-crystal system thereby making them fall within a range of predetermined angles, while the lenticular lens sheet has the function of again diffusing the rays of image light having passed through the Fresnel lens sheet, thereby making them fall within a range of suitably broadened angles.

FIG. 4 shows a schematic perspective view of a rear-projection screen. As shown in FIG. 4, a rear-projection screen comprises basically a Fresnel lens sheet 2 and a lenticular lens sheet 1. In some cases there is also provided a translucent sheet 3, called a front plate, on the light exit surface of the lenticular lens sheet 1. Such a translucent sheet 3 is disclosed for instance in Japanese Unexamined Patent Application Publication Nos. H8-22077 or H7-307912. The translucent sheet 3 is provided for protecting the lenticular lens sheet and for obtaining a surface luminance similar to that of ordinary CRT televisions.

The Fresnel lens sheet 2 is constituted by a Fresnel lens, provided on the light exit side, that comprises equally spaced concentric fine-pitch lenses.

The lenticular lens sheet 1 is constituted by a translucent substrate wherein are formed a plurality of lenticular lenses 11 on the side receiving the incident image light. The other surface of the lenticular lens sheet 1, through which the image light exits, is generally formed so as to have thereon condensing sections 12, in the shape of a convex lens, which condense the image light from the lenticular lenses 11. The condensing sections 12 are lenticulated so as to improve their ability to diffuse the rays of image light in the horizontal direction. In particularly, when the lenticular lens sheet 1 is used in combination with three-tube CRT light sources, the condensing sections 12 must be indispensably lenticulated so as to correct the 3-color color shift. The non-condensing sections 13 (sections other than the condensing sections 12), in which the image light from the lenticular lenses 11 formed on the surface that receives the image light are not condensed, are ridged with side faces and tops parallel to the lenticular lens sheet 1. The tops of the ridges and the sides of each ridge adjacent to its top (the upper sides thereof) are all coated with an external light-absorbing layer 14 of black pigments etc., applied through roll coating, screen printing, transfer printing or the like, to form ridged external light-absorbing sections. Thus, the lenticular lens sheet 1 reduces, among the external light incident on the lenticular lens sheet 1, the light reflected through the light exit surface back toward the viewer, thereby increasing image contrast.

FIG. 5 is an enlarged-cross section of a conventional lenticular lens sheet 1. As shown in the figure, the non-condensing sections 13 comprise sides 13a, 13b and tops 13c. Herein external light-absorbing sections are formed by an external light-absorbing layer 14 provided on the tops 13c and on part of the sides 13a, 13b. In order to achieve effectively a further contrast increase, Japanese Unexamined Utility Model Application Publication No. S59-87042 proposes for instance providing an external light-absorbing layer 14 on the tops 13 and on the entirety of the sides 13a, 13b.

However, the sides of the external light-absorbing sections in conventional lenticular lens sheets rise very steeply, which is problematic in that part of the light exiting from the condensing sections hits against the shoulders of the light-absorbing sections, thereby narrowing the viewing angle.

The tops of the conventional lenticular lens sheets have also the drawback of being perpendicular to the viewer, which increases the amount of external light reflected back to the viewer, resulting thus in a worse contrast.

In order to solve the above problems, an object of the present invention is to provide a wide viewing-angle lenticular lens sheet and manufacturing method for same.

Another object of the present invention is to provide a high-contrast lenticular lens sheet and manufacturing method for same.

DISCLOSURE OF THE INVENTION

The lenticular lens sheet according to the present invention has a plurality of lenticular lenses disposed on one surface of a translucent substrate, convex lenses disposed on the other surface of the translucent substrate, each at a condensing position in which light from the lenticular lenses is condensed; and convex external light-absorbing sections disposed on the other surface of the translucent substrate at positions different from the condensing positions; wherein the external light-absorbing sections are constituted only by slant surfaces.

In a preferred embodiment, the external light-absorbing sections are constituted by two slant surfaces.

The external light-absorbing sections may have a plurality of ridge shapes constituted by two slant surfaces.

An external light-absorbing layer is preferably provided on the slant surfaces of the external light-absorbing sections.

The manufacturing method for a lenticular lens sheet according to the present invention comprises the steps of: manufacturing a lenticular lens substrate that comprises a plurality of lenticular lenses disposed on one surface of the translucent substrate, and convex external light-absorbing sections disposed on the other surface of the translucent substrate at positions different from condensing positions in which light from the lenticular lenses is condensed; and forming an external light-absorbing layer on the slant surfaces of the external light-absorbing sections.

Herein, the light-absorbing layer is preferably formed by roll printing.

The present invention allows providing a wide viewing-angle lenticular lens sheet and a manufacturing method for same. The present invention allows also providing a high-contrast lenticular lens sheet and a manufacturing method for same.

BEST MODE FOR CARRYING OUT THE INVENTION

Preferred Embodiment 1

Figure 1:
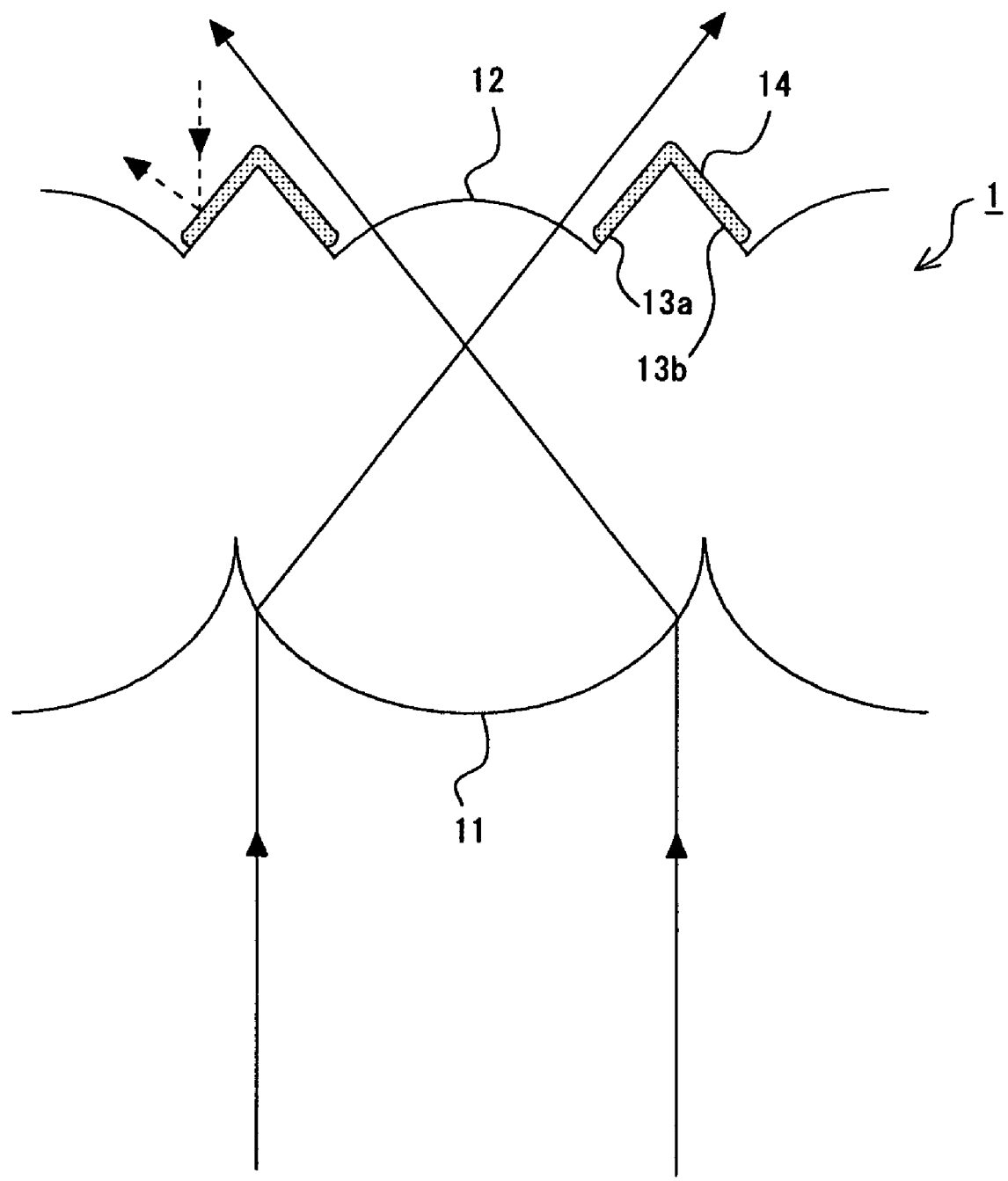
FIG. 1 is a partial cross-sectional view of a lenticular lens sheet according to the present invention.

FIG. 1 is a partial schematic view of a lenticular lens sheet 1 according to the present invention. The lenticular lens sheet 1 according to the present invention has a translucent substrate with a plurality of lenticular lenses 11 formed on the side where the image light is incident. On the side where the image light of the lenticular lens sheet 1 exits are formed condensing sections 12, in the shape of a convex lens, that condense the light coming from the lenticular lenses 11 formed in the incident light side.

The present invention is distinctly characterized by the particular shape of the ridged external light-absorbing sections provided in the non-condensing sections 13 (sections other than the condensing sections 12) that condense the light coming from the lenticular lenses 11 formed in the incident light side. As illustrated in FIG. 1, the external light-absorbing sections are constituted by ridged non-condensing sections 13 comprising only two slant surfaces 13a and 13b. Specifically, the external light-absorbing sections have no tops parallel to the lenticular lens sheet 1. This does not mean that the highest portion of the external light-absorbing sections forms a perfectly acute angle, since a certain roundness is bound to remain as a result of the manufacturing process. The height of the external light-absorbing sections is set to be greater than the height of the condensing sections 12.

The ridged non-condensing sections 13 formed by the slant surfaces 13a, 13b are coated with an external light-absorbing layer 14 of black pigments, etc., applied through roll printing, screen printing, transfer printing or the like, to form ridged external light-absorbing sections. Thus, the lenticular lens sheet 1 reduces, among the external light incident on the lenticular lens sheet 1, the light reflected through the light exit surface back toward the viewer, thereby increasing image contrast. This light-absorbing layer 14 is formed almost all the way down to the bottom of the slant surfaces 13a, 13b.

The slant surfaces 13a, 13b form a right angle with sides substantially parallel to the directions (solid-line arrows in FIG. 1) of the light incident on the lenticular lenses 11 and exited from the end of the condensing sections 12. With such a constitution, the non-condensing sections 13 do not hinder the light exited from the condensing sections 12, thereby affording a wider visual angle.

The light incident from the side of the viewer (dotted lines in FIG. 1) is reflected by the slant surfaces 13a, 13b of the non-condensing sections 13 towards left and right, i.e. not in the direction of the viewer; this allows preventing contrast degradation in bright environments.

The manufacturing method of the lenticular lens sheet 1 is described in detail below focusing on the application of the external light-absorbing layer 14 onto the lenticular lens sheet 1. Roll printing is used for applying the light-absorbing layer 14 in this method.

Firstly, a lenticular lens sheet 1 is manufactured by fusion and extrusion of a translucent thermoplastic resin. Specifically, a translucent thermoplastic resin is extruded between a pair of metallic forming rollers, the first of which is carved with the inverted shape of the lenticular lenses 11, while the second is carved with the inverted shape of the ridged condensing sections 12 and the inverted shape of the non-condensing sections 13; by filling the carved shapes, the resin is formed into a lenticular lens sheet. The inverted shapes of the forming rollers are usually formed by lathe-carving of the copper-plated surfaces of the forming rollers. The lenticular lens sheet substrate is composed of, for instance, polymethylmethacrylate (PMMA), acrylic resins such as copolymers of PMMA with ethyl acrylate or methyl acrylate, vinyl chloride resins, MS resins, polycarbonate, polystyrene, impact-grade acrylic resins with copolymerized or dispersed rubber components, etc.

Figure 2A:
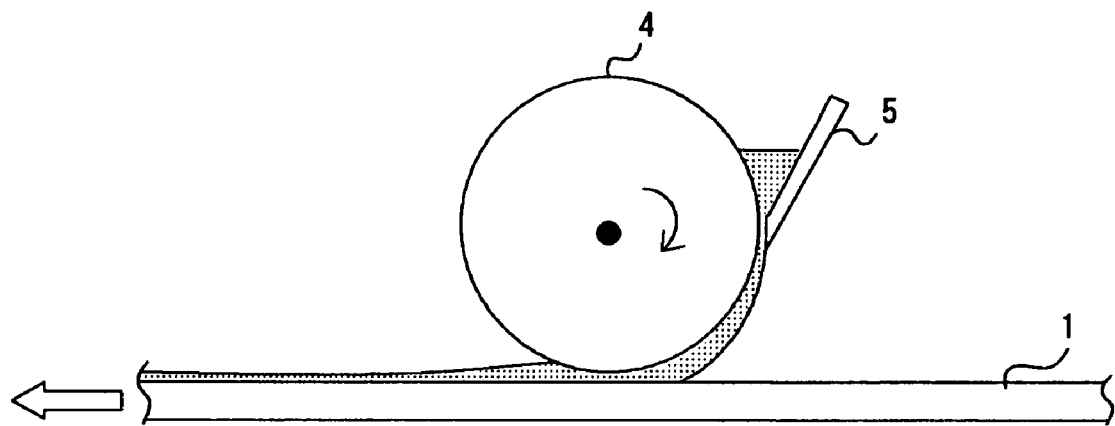
FIGS. 2A and 2B are explanatory diagrams of a lenticular lens sheet manufacturing method according to the present invention.

As shown in FIG. 2A, the lenticular lens sheet 1 is carried by a transport mechanism omitted in the figure, with the light-exit surface having the condensing sections 12 and the non-condensing sections 13 facing up. In the figure, the lenticular lens sheet 1 is moved from right to left by the transport mechanism. On the upper side of the lenticular lens sheet 1 is arranged a printing roller 4 which rotates in the direction shown by the arrow. A doctor blade 5 is provided to the right of the printing roller 4.

An unhardened light-absorbing material is poured between the printing roller 4 and the doctor blade 5. Light-absorbing materials that may be used herein include any known ink compositions or coating compositions of solvent types, reactive two-liquid types, UV-curable types or the like, which contain a vehicle as selected in consideration of the material of the translucent substrate used, and contains a light-absorbing black pigment, silica, calcium carbonate or the like serving as a matting agent. More specifically, "VAR ink" from Teikoku Printing Inks Mfg. Co., Ltd. may be used for instance as the light-absorbing material. When the printing roller 4 turns, the light-absorbing material, adhered to the outer face of the printing roller 4, is transferred to the lenticular lens sheet 1. The light-absorbing material adhered to the outer face of the printing roller 4 comes in contact with the non-condensing sections 13 of the lenticular lens sheet 1 and is thereby applied onto the slant surfaces 13a, 13b of the non-condensing sections 13. Herein the speed of the outer face of printing roller 4 and the speed of the substrate are substantially identical, though not necessarily so.

Figure 2B:
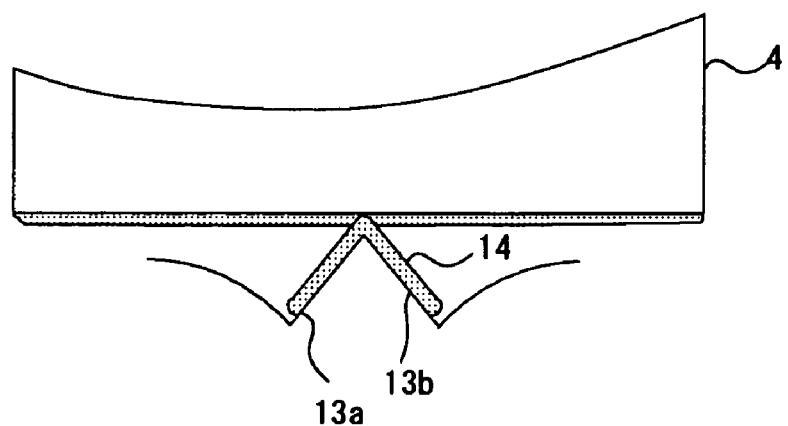

FIG. 2 B is an enlarged view of the portion in which the printing roller 4 comes in contact with the non-condensing sections 13. As shown in the figure, the light-absorbing material adhered to the printing roller 4 is applied to the slant surfaces 13a, 13b forming a light-absorbing layer 14.

Apart from roller printing, other methods used for forming the external light-absorbing layer 14 include for instance screen printing, gravure printing, offset printing, gravure offset printing, letterpress printing, transfer printing, curtain printing, spray coating, etc.

Preferred Embodiment 2

Figure 3:
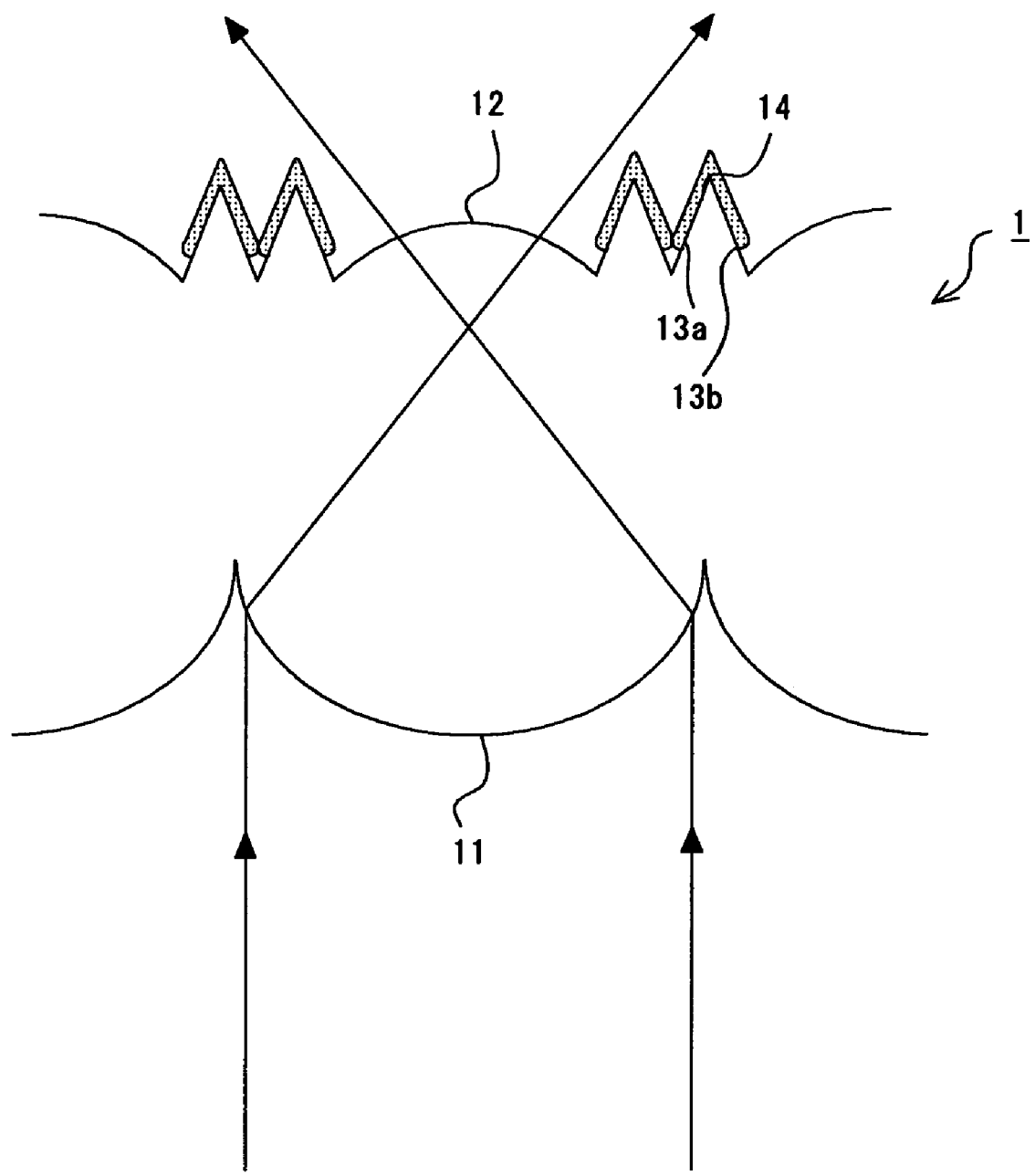
FIG. 3 is a partial cross-sectional view of a lenticular lens sheet according to the present invention.
Figure 4:
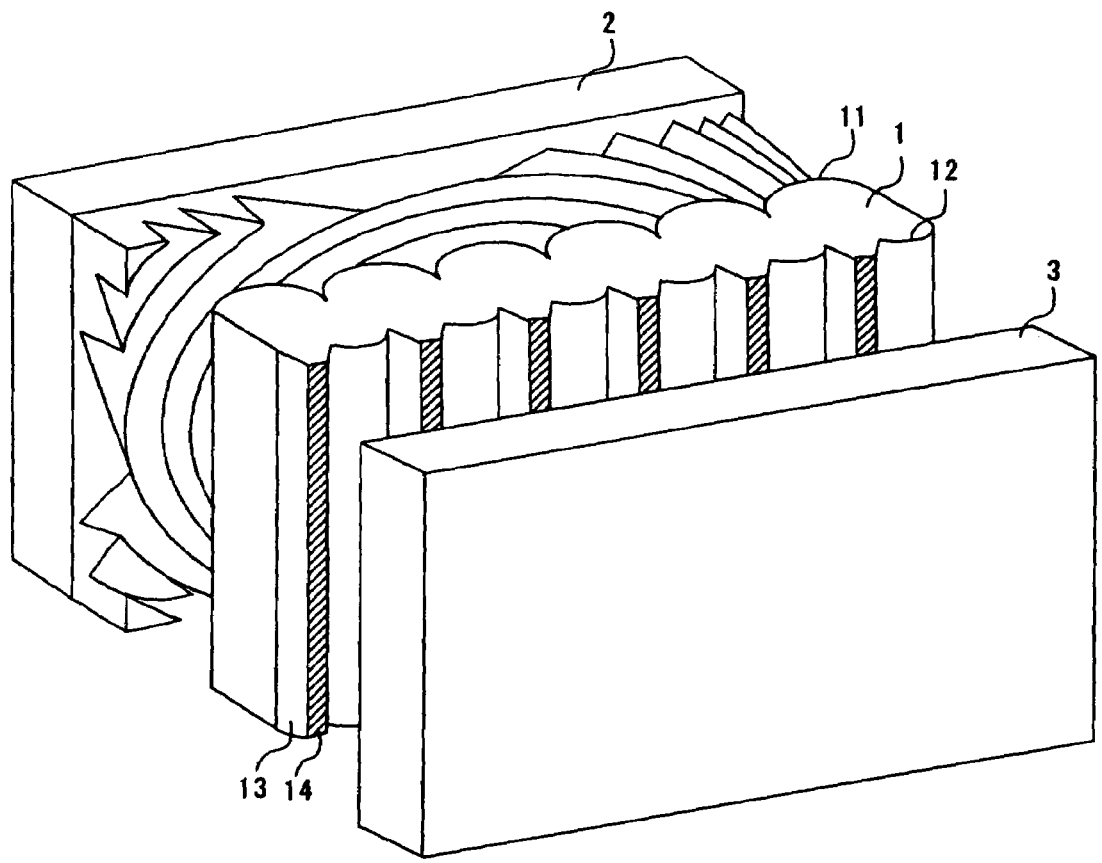
FIG. 4 is a schematic perspective view of a conventional rear-projection screen.
Figure 5:
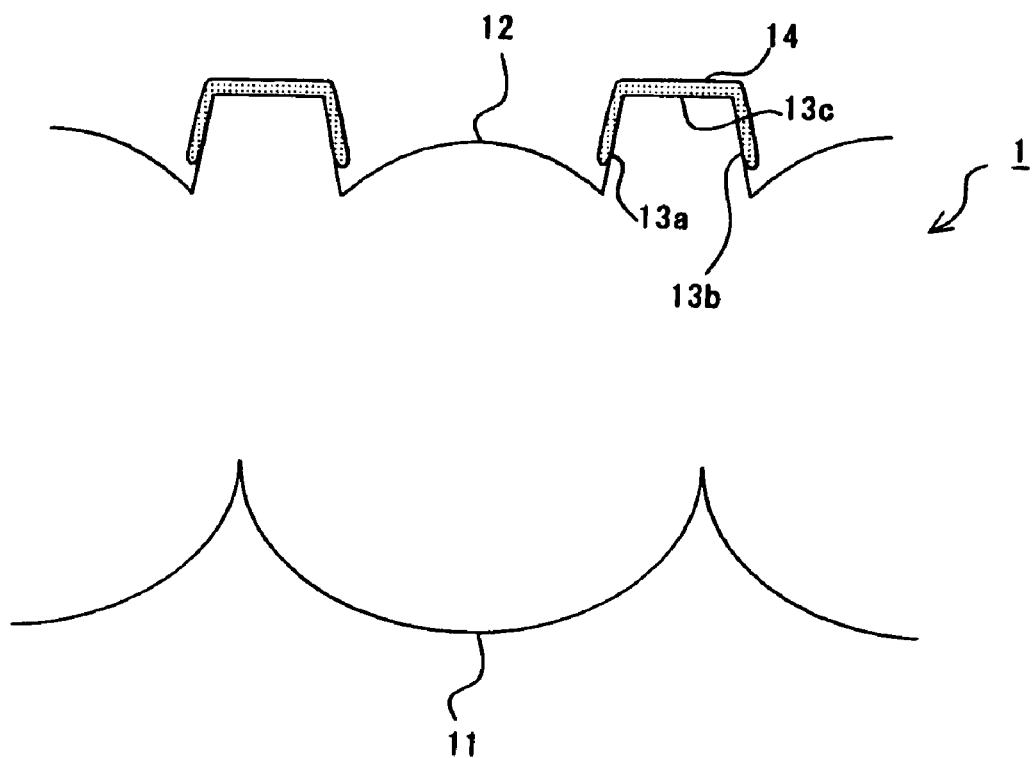
FIG. 5 is a partial cross-sectional view of a conventional lenticular lens sheet.

FIG. 3 shows a partial cross-sectional view of a preferred embodiment 2 of a lenticular lens sheet according to the present invention. As shown in the figure, the non-condensing sections 13 of the lenticular lens sheet 1 comprise slant surfaces 13a, 13b in the form of a double peak. Each of these peak shapes is printed with an external light-absorbing layer 14.

The slant surfaces 13a, 13b form a right angle with sides substantially parallel to the directions (solid-line arrows in FIG. 1) of the light incident on the lenticular lenses 11 and exited from the end of the condensing sections 12. With such a constitution, the non-condensing sections 13 do not hinder the light exited from the condensing sections 12, thereby achieving a wider visual angle.

The light incident from the side of the viewer is reflected by the slant surfaces 13a, 13b of the non-condensing sections 13 towards left and right, i.e. not in the direction of the viewer, which has the effect of allowing preventing contrast degradation in bright environments. In particular, a double peak shape with steeper slant surfaces 13a, 13b, as in this case, allows reducing reflection towards the viewer.

The manufacturing method of the lenticular lens sheet in the Preferred embodiment 2 according to the present invention is identical to that of Preferred embodiment 1, differing only in the forming step of the non-condensing sections 13, so its explanation is not repeated herein.

Other Preferred Embodiments

In the Preferred embodiment 1 according to the present invention described above the non-condensing sections 13 were provided as 2 peaks; however this number is not limited thereto and may be 3 or higher.

The non-condensing sections 13 of the lenticular lens sheet 1 may be bonded to the translucent sheet 3.

Embodiments

Figure 6:
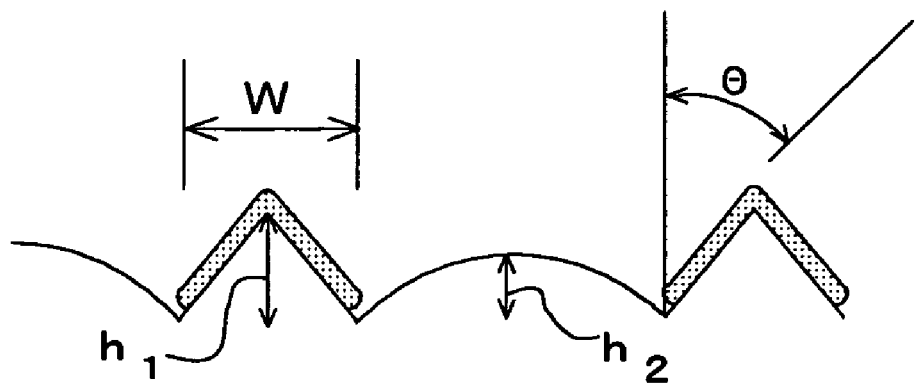
FIG. 6 is a partial cross-sectional view of an embodiment of a lenticular lens sheet.
Figure 6:
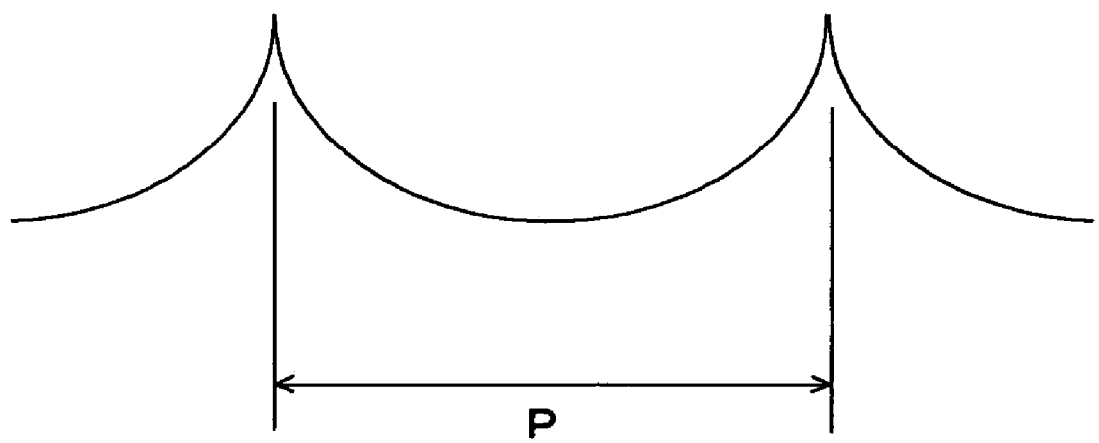
Figure 7:
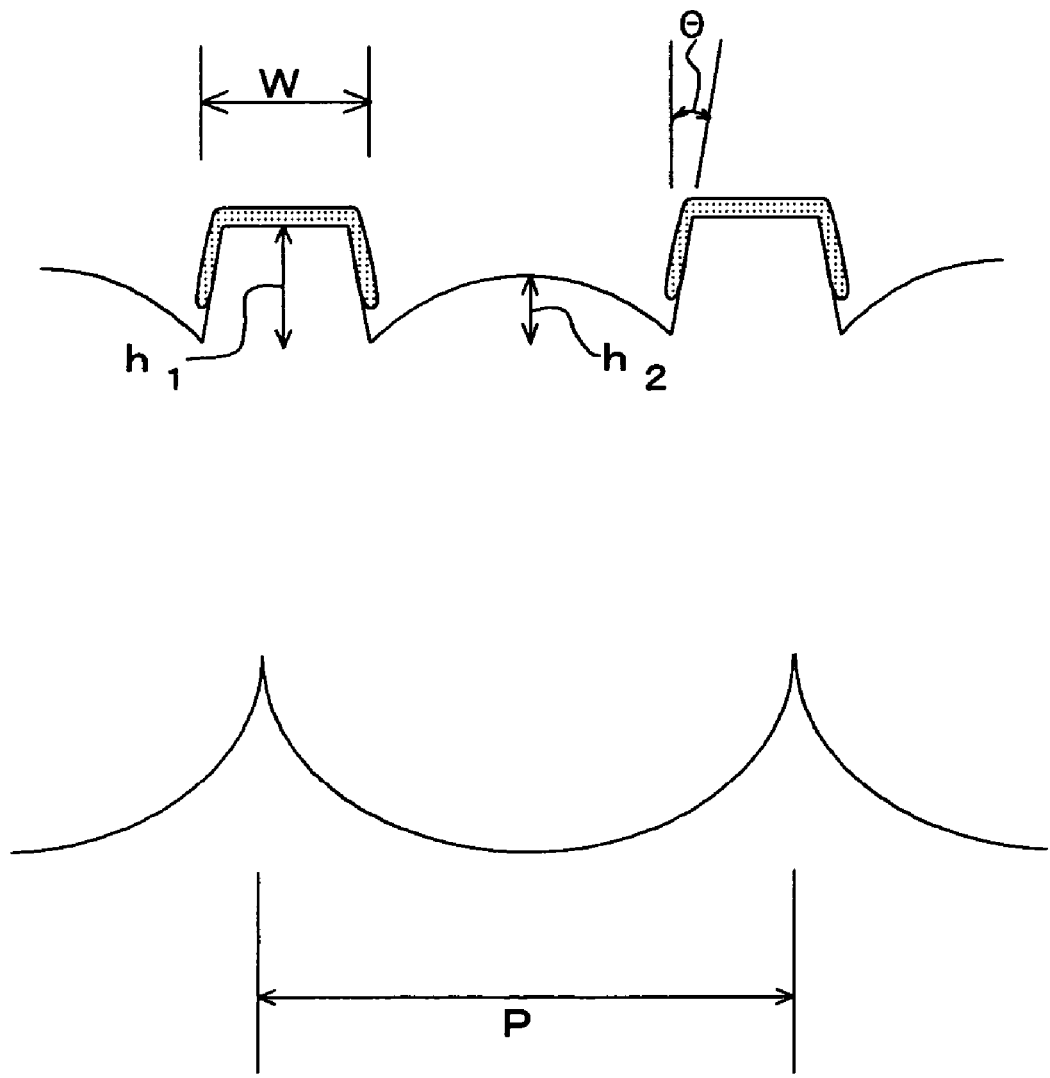
FIG. 7 is a partial cross-sectional view of a comparative example of a lenticular lens sheet.

Luminance measurement was carried out for an embodiment of lenticular lens sheet having the structure shown in FIG. 6 and for a comparative example of a lenticular lens sheet having the structure shown in FIG. 7. The lenticular lens sheet of the embodiment shown in FIG. 6 has an external light-absorbing layer having a BS width w of 0.25 mm, an angle θ=45° formed by the slant surfaces of the non-condensing sections and the normal of the principal surface of the lenticular lens sheet, a non-condensing section height h1 of 0.13 mm, a condensing section height h2 of 0.05 mm, and a lens pitch P of the lenticular lens of 0.5 mm. Herein, h1 and h2 are defined as the distance between the lowest point in a plane shared by the non-condensing sections and the condensing sections, and the apex of the non-condensing sections (h1) and the apex of the light condensing sections (h2). In a similar way, the lenticular lens sheet of the comparative example shown in FIG. 7 has an external light-absorbing layer having a BS width w of 0.25 mm, an angle θ=3° formed by the slant surfaces of the non-condensing sections and the normal of the principal surface of the lenticular lens sheet, a non-condensing section height h1 of 0.13 mm, a condensing section height h2 of 0.05 mm, and a lens pitch P of the lenticular lens of 0.5 mm.

Figures 8, 9:
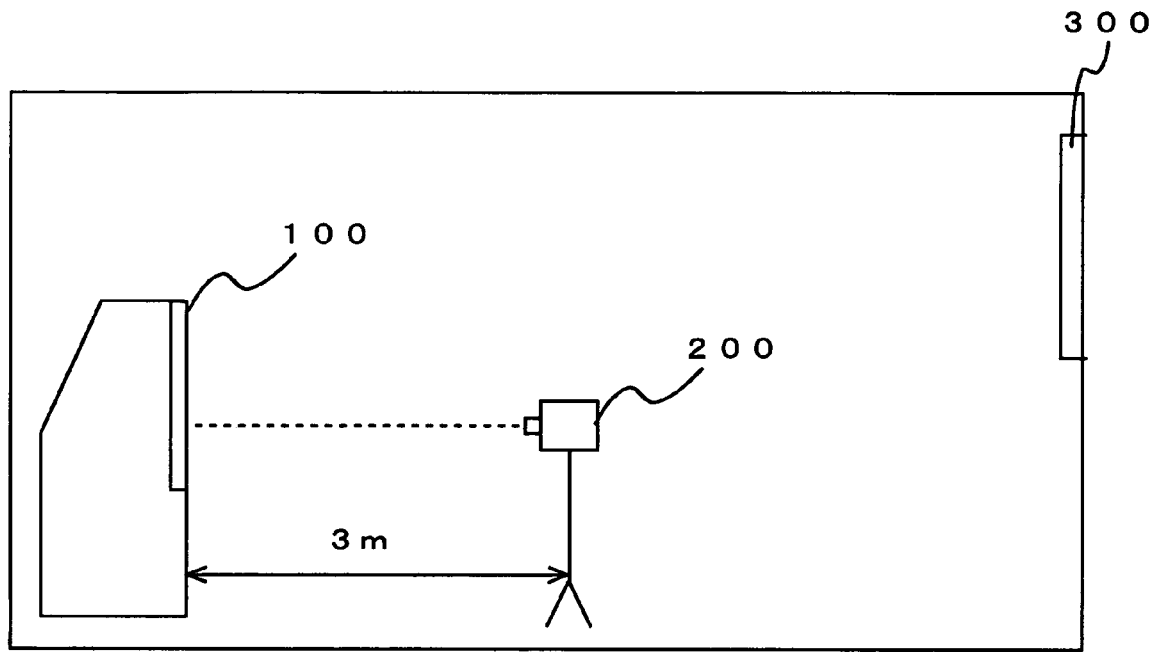
FIG. 8 is an explanatory diagram of a reflected luminance measurement environment.
FIG. 9 is a table listing the measurement results for the embodiment and the comparative example.

The arrangement for measuring reflection luminance is explained below with reference to FIG. 8. In FIG. 8, 100 is a projection television set provided with a rear-projection screen having a lenticular lens sheet; 200 is a luminance meter arranged at a distance of 3 m in front of the screen surface, and 300 is a window arranged in front of the projection television set. The luminance meter 200 is placed in front of the center of the screen. The only external light comes from the window 300. The measurement environment shown in FIG. 8 was thus a room with window 300 behind the measurement position at which the luminance meter 200 is placed; the illumination upon the screen at the time of measurement was about 300 lux (1×).

FIG. 9 illustrates the measurement results for reflected luminance and viewing angle of the lenticular lens sheet in the Embodiment and Comparative example. As shown in the figure, the values for the Embodiment were: reflected luminance was 3.4 cd/m$^2$ and the viewing angle Hα 35°, Hγ 60°, Vα 4°. In the comparative example, reflected luminance was 5.0 cd/m$^2$ and the viewing angle Hα 35°, Hγ 45°, Vα 4°. The reflected luminance in the Embodiment was smaller and the viewing angle Hγ wider than was obtained in the Comparative example.

INDUSTRIAL APPLICABILITY

The lenticular lens sheet according to the present invention is used for instance in rear-projection televisions.

The invention claimed is:

1. A manufacturing method for a lenticular lens sheet comprising:

manufacturing a lenticular lens substrate that comprises a plurality of lenticular lenses disposed on a first surface of a translucent substrate so that each lenticular lens has a longest dimension in a lenticular lens longitudinal direction, and convex external light-absorbing sections disposed on a second surface of the translucent substrate at positions different from condensing positions in which light from the lenticular lenses is condensed; and forming an external light-absorbing layer on slant surfaces of the external light-absorbing sections;

wherein the external light-absorbing layer is formed by roll printing;

wherein said roll printing is performed by rotating a printing roll in a forward direction and said roll printing using a feeding direction of the lenticular lens substrate being printed on that is parallel to the lenticular lens longitudinal direction on the lenticular lens substrate; and wherein said roll printing comprises:

applying an unhardened light-absorbing material to an outer face of said printing roller, and transferring the unhardened material to the lenticular lens substrate as said printing roller turns.

* * * * *